United States Patent

[11] 3,582,539

[72] Inventor Jimmy W. Wheeler
Mesquite, Tex.
[21] Appl. No. 777,226
[22] Filed Nov. 20, 1968
[45] Patented June 1, 1971
[73] Assignee Teletronics Industries, Inc.
Dallas, Tex.

[54] COLOR PHASE LOCK
7 Claims, 1 Drawing Fig.

[52] U.S. Cl. .......... 178/5.4, 331/20
[51] Int. Cl. .......... H04n 9/44
[50] Field of Search .......... 178/5.4, 7.3 S, 7.5 (Transistor), 69.5 CB, 5.4; 330/116; 328/104, 133, 109; 307/232, 256, 259, 271, 297, 320, 321; 331/20

[56] References Cited

UNITED STATES PATENTS

| | | | |
|---|---|---|---|
| 2,768,296 | 10/1956 | Herzog .......... | 178/7.5 |
| 2,782,310 | 2/1957 | Kabell .......... | 331/20 |
| 2,853,546 | 9/1958 | Szklai .......... | 178/5.4 |
| 3,205,452 | 9/1965 | Saudinaitis .......... | 331/20 |

*Primary Examiner*—Richard Murray
*Assistant Examiner*—Alfred H. Eddleman
*Attorneys*—Ned L. Conley, Murray Robinson, James A. Bargfrede, Robert W. B. Dickerson and Bill B. Berryhill

ABSTRACT: A color sync system for a color television receiver comprising a color burst amplifier, a phase detector, and a subcarrier reference oscillator, and including a diode to receive the output signal of the phase detector and automatically vary the capacitance of the input-tuned circuit of the oscillator.

PATENTED JUN 1 1971 3,582,539
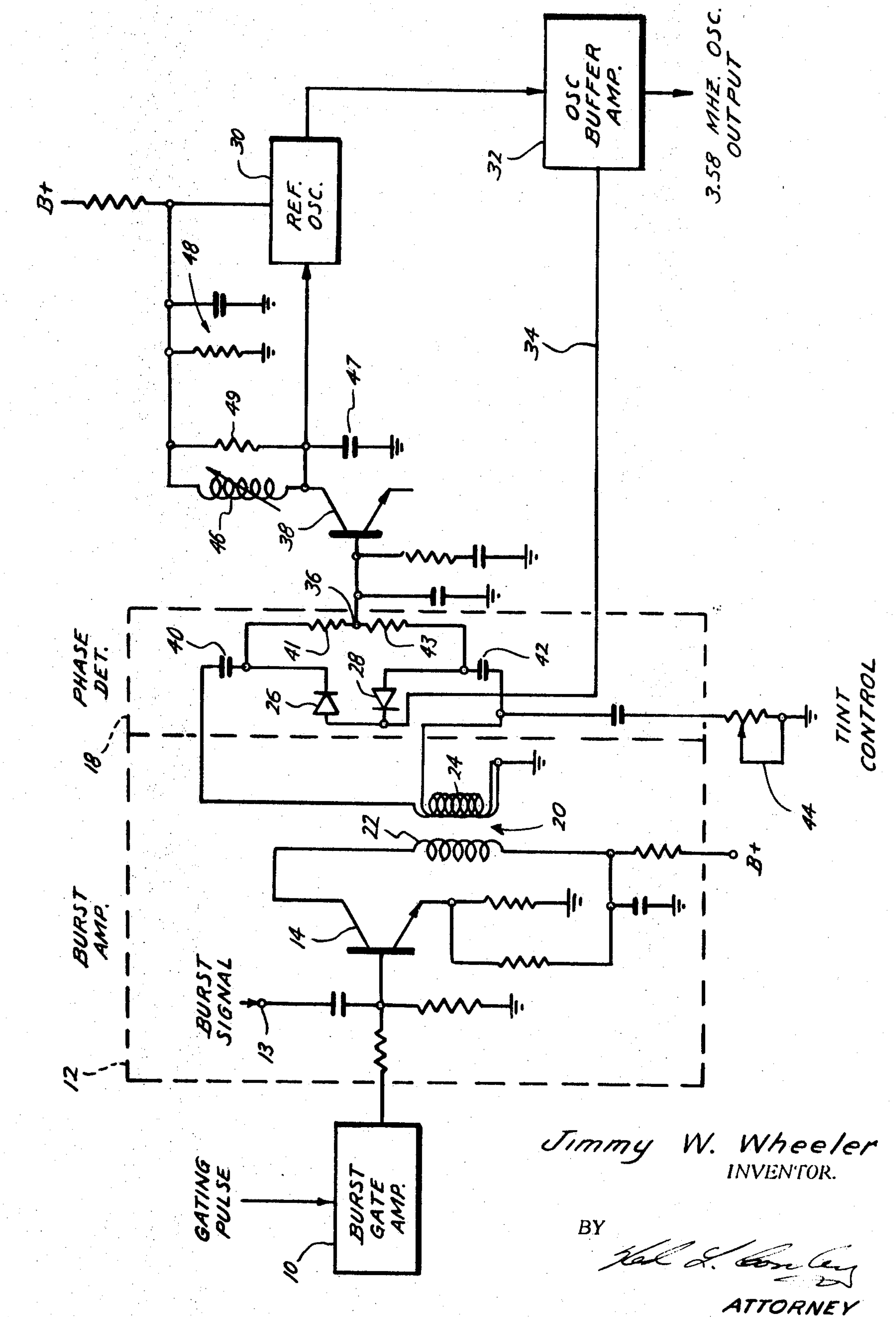
Jimmy W. Wheeler
INVENTOR.
BY
ATTORNEY

COLOR PHASE LOCK

BACKGROUND OF THE INVENTION

1. Field of the Invention

This invention relates to circuitry for color television receivers, and more particularly it relates to circuitry for controlling the frequency of the color subcarrier reference oscillator.

2. Description of the Prior Art

In color television as used in the United States the luminance component of a color picture is transmitted independently by modulation of the picture carrier, and the color components are transmitted as color difference signals by modulation of two 3.58 mHz. color subcarriers, which are displaced in phase by 90°. In practice the two subcarriers are produced from a single source with two branched outputs. On one the phase is unchanged, and on the other it is shifted 90°.

At the receiver the two color components are again separated and recreated by synchronous demodulators. The in-phase A-M signal is demodulated by applying to the synchronous detector an unmodulated 3.58 mHz. subcarrier of the same phase as was used in the original amplitude modulation. The quadrature phased modulated signal is demodulated in the same manner except that the subcarrier is shifted 90° to correspond exactly to the phase in the original modulation. This imposes the requirement that there must be available at both transmitter and receiver subcarrier voltages of identical frequency and phase.

It is impractical to attain such precise control of unmodulated subcarrier frequency and phase by the use of a free-running subcarrier oscillator at the receiver. Thus, means have heretofore been devised to control precisely a receiver subcarrier oscillator from the original 3.58 mHz. transmitter oscillator. This is accomplished by transmitting bursts of unmodulated subcarrier power from the transmitter to the receiver for use in locking the frequency and phase of the receiver 3.58 mHz. oscillator.

The subcarrier bursts are transmitted by modulation of the horizontal blanking pedestal. From 8 to 11 cycles of the subcarrier frequency are transmitted. At the receiver a pulse gate isolates the subcarrier bursts from all other voltages at times when the burst is being received.

In prior art receivers which utilize vacuum tubes, the receiver subcarrier oscillator phase is locked to the burst phase by means of a phase detector and a reactance tube. The burst and oscillator phases are compared in the phase detector. Any difference produces a succession of pulses which occur at the gating frequency. These are filtered to produce a DC control voltage which causes the reactance tube to correct the oscillator phase. In such a system the reactance tube functions as a variable capacitor across the input-tuned circuit of the oscillator. Variation of this electronic capacitance will, over a limited range, vary the frequency of the oscillator.

This automatic phase control system (also known as the phase lock loop) has heretofore been considered the most reliable system for maintenance of oscillator phase and frequency. However, such a system is impractical for use in a solid-state color sync system, utilizing a transistor equivalent of a vacuum tube reactance control circuit. The low resistance of the reactance transistor places too great a load on the high resistance of the phase detector output. Furthermore, the available signal from the phase detector is not sufficient to drive the reactance transistor because of the low capacitance change available in the collector circuit of the reactance transistor and the low impedance of the reactance circuit.

These specific problems may be overcome by installation of a DC amplifier between the phase detector and the reactance transistor. However, this greatly increases the complexity of the circuitry and adds an additional problem of instability of the DC amplifier with changes in temperature.

SUMMARY OF THE INVENTION

It is an object of this invention to provide automatic frequency and phase control of the 3.58 mHz. oscillator by means of a wholly transistorized circuit.

It is another object of the invention to provide such control with highly reliable circuitry allowing maximum simplicity of production while producing minimum service problems.

In accordance with a preferred embodiment of this invention a reverse-biased voltage-variable capacitance diode is used in the input-tuned circuit of the 3.58 mHz. oscillator to control its output phase and frequency in response to a potential difference generated in the phase detector as a result of differences in phase of the local oscillator and the color burst signal. A resistance in the tuned circuit may be used to prevent forward conduction in the diode and increase the range of control. In this system the high resistance of the reactance diode when reverse biased to the best operating point prevents loading of the phase detector. The diode is extremely sensitive to signal variations, so that it will change capacitance over a wide range in response to comparatively small voltage changes from the phase detector. Furthermore, temperature sensitivity is practically nil. Because of the simplicity of the circuit, production and field service problems are substantially reduced.

BRIEF DESCRIPTION OF THE DRAWING

The single FIGURE of the drawing depicts a circuit diagram, partially in block form, showing a preferred embodiment of the invention.

DESCRIPTION OF THE PREFERRED EMBODIMENTS

In the embodiment of this invention shown in the drawing a gating pulse from the synchronizing and deflection section of the receiver is fed through a burst gate amplifier 10 to the burst signal amplifier 12. The burst signal is fed into the amplifier from the chrominance circuit at 13. The burst signal amplifier comprises a transistor 14 which is normally cut off (by a high positive voltage on the emitter) except when the pulse from the gate 10 allows a color burst to pass through. At these instants a negative pulse from the synchronizing section is fed to the burst gate amplifier, and is reversed in polarity and applied as a positive pulse to the base of the color burst amplifier. This positive pulse counteracts the positive emitter voltage and permits the transistor to conduct, amplifying and then transferring the color burst to the following phase detector 18.

The connection between the burst amplifier and the phase detector is made by a transformer 20 consisting of a high impedance primary 22 and a bifilar secondary 24 tightly coupled to the primary. The signals developed across the two coils of the bifilar secondary are equal in amplitude but opposite in phase.

In the phase detector two diodes 26, 28 compare the frequency and phase of the received color burst with the frequency and phase of a 3.58 mHz. signal generated in the reference oscillator 30. Capacitors 40 and 42 keep the diodes cut off except near the peak region of each burst cycle. The 3.58 mHz. reference signal is brought into the phase detector circuit through the oscillator buffer amplifier 32 and the connection 34, and both of the diodes 26, 28 receive the signal in phase. As is well known in the art, if any phase difference exists between the two signals a correction voltage is developed across the resistances 41, 43 at the point 36. Adjustments in tint or hue are made through the tint control 44.

According to a preferred embodiment of the present invention, this correction voltage is fed to the base of the transistor 38, which in this application is functioning as a reverse-biased voltage-variable capacitance diode, the emitter being left free. A diode having the correct characteristics might also be used. The desired characteristics are determined from the capacitance change required to effect the necessary frequency correction in the reference oscillator. A capacitance range sufficient to cause a frequency variation of 1,000 cycles is usually considered to be sufficient. Preferably the diode or transistor is chosen for operation with about ½-volt reverse bias when the reference oscillator is in phase with the burst signal, and the bias is varied between 0 and 1 volt to obtain capacitance changes, necessary to adjust reference oscillator frequency.

The transistor 38, being connected in the input circuit of the reference oscillator 30, serves to modify the resonant frequency of the tuned circuit comprising the variable reactance coil 46, the capacitor 47, and the resistance 49. The coil 46 has a range of inductance such that it can be adjusted, with the phase detector cut out, to the precise reactance necessary to tune the circuit to produce the desired 3.58 mHz. reference frequency when the capacitance of the transistor 38 is in the center of its range of variation produced by the potential from the phase detector. The tuned circuit is thus set for maximum positive and negative control by the variable-capacitance diode. In a preferred embodiment of the invention, the circuits are designed for a reverse bias of from 0 to 1 volt on the capacitor 38. Such a potential may be established by a voltage divider as at 48. The resistance 49 in the tuned circuit reduces the Q of the circuit, thereby increasing the effect of voltage variations on the frequency so that adequate frequency changes can be accomplished with very low changes in potential. At the same time, the amplitude is damped sufficiently to prevent the diode from going into forward conduction.

An even greater range of frequency control can be obtained by choosing a variable capacitance diode having a large enough range of capacitance to allow deletion of capacitor 47 from the circuit.

Thus a novel color phase lock circuit has been disclosed in which the capacitance in the reference oscillator input-tuned circuit is varied over a wide range by a small potential difference created as a result of errors in the reference oscillator frequency or phase.

Various embodiments of the invention are shown in the drawing and described in the specification, but many variations thereof will be apparent to those skilled in the art. It is not practical to show or describe all the variations included within the invention, and therefore the embodiments described should be considered illustrative only, and not limiting, the scope of the invention being as broad as is defined by the appended claims. The form of the claims and the specification, including the abstract, is adopted solely for easier reading and understanding, and should not be considered in interpreting the scope of the invention claimed.

I claim:

1. A system for controlling a color reference signal in a color television receiver wherein a color image is produced in response to a received composite color television signal including recurring bursts of a color-synchronizing signal, comprising in combination, oscillator means having input-tuned circuit means and adapted to produce a color reference signal, phase detector means adapted to produce a bias potential of from about 0 to about 1 volt, proportional to a phase difference between the burst signal and the color reference signal, transformer means coupling said burst signal to said phase detector, conductor means feeding said color reference signal to said phase detector, A voltage-variable capacitance diode forming a part of said input-tuned circuit and connected for reverse biasing by said bias potential, and a resistance in said tuned circuit sufficient to reduce the amplitude of the signal therein to prevent forward conduction through said diode and to reduce the Q of the tuned circuit to obtain greater range of correction of the frequency of the color reference signal.

2. In a color sync system for a color television receiver wherein a phase detector produces a bias potential dependent upon a comparison of the phase and frequency of the color burst signal and the color subcarrier oscillator, and wherein said bias potential is used to control the frequency of said oscillator, the improvement which comprises A solid-state element whose reactance automatically varies with the bias on it, said solid-state element being in the input-tuned circuit of said oscillator, means to connect the bias potential from the phase detector to bias said solid-state element, and means damping the amplitude of the signal in the input-tuned circuit sufficient to prevent the solid-state element from going into forward conduction.

3. A color sync system as defined by claim 2 wherein said damping means comprises a resistance connected to lower the Q of the tuned circuit.

4. A color sync system as defined by claim 2 wherein the bias on said solid-state element is variable from about 0 to about 1 volt.

5. A color sync system as defined by claim 2 wherein said solid state element is a reverse-biased voltage-variable capacitance diode.

6. A color sync system as defined by claim 5 wherein the reverse bias on said diode is variable from about 0 to about 1 volt.

7. A system for controlling a color reference signal in a color television receiver wherein a color image is produced in response to a received composite color television signal including recurring bursts of a color-synchronizing signal, comprising in combination, transformer means comprising a primary connected to receive said color burst signal, and a bifilar secondary in which the signals developed across the two coils are equal in amplitude but opposite in phase, A diode connected to each secondary coil of the transformer, one being connected at the anode and one at the cathode, oscillator means have input-tuned circuit means and adapted to produce a color reference signal, a voltage-variable capacitance diode forming a part of said input-tuned circuit, conductor means feeding said color reference signal to the diodes to compare the phase of the color burst signal with the phase of the color reference signal, means connecting the first-named diodes to produce a bias potential of from about 0 to about 1 volt, proportional to a phase difference between the color burst signal and the color reference signal, and means connected to feed said bias potential to said voltage-variable capacitance diode for reverse biasing thereby.